United States Patent [19]

Okubo et al.

[11] 4,446,203

[45] May 1, 1984

[54] ASBESTOS-FREE FRICTION MATERIALS

[75] Inventors: Howard S. Okubo, Chicago; Clarence E. Albertson, Villa Park; Roger K. Nibert, Hoffman Estates, all of Ill.

[73] Assignee: Borg-Warner Corporation, Chicago, Ill.

[21] Appl. No.: 477,195

[22] Filed: Mar. 21, 1983

[51] Int. Cl.$^3$ .............................................. B32B 5/16
[52] U.S. Cl. ................................... 428/283; 428/288; 428/323; 428/902
[58] Field of Search ............... 428/283, 288, 323, 328, 428/330, 902; 188/251 A, 251 M; 192/107 M

[56] References Cited

U.S. PATENT DOCUMENTS 3,967,037 6/1976 Marzocchi et al. ................ 428/392
4,244,994 1/1981 Trainor et al. ................ 188/251 A
4,320,823 3/1982 Covaleski ........................ 188/251 A

FOREIGN PATENT DOCUMENTS 2003088 3/1979 United Kingdom.

Primary Examiner—James J. Bell
Attorney, Agent, or Firm—Joseph Shekleton

[57] ABSTRACT

An asbestos-free friction material characterized by good friction and wear properties. It comprises the combination of a binder resin, copper oxide, antimony sulfide and an aromatic polyamide resin. Barytes is also a valuable additive in the combination.

7 Claims, No Drawings

ND FRICTION MATERIALS

ASBESTOS-FREE FRICTION MATERIALS

This invention relates as indicated to asbestos-free friction materials. More particularly, it relates to such materials as are especially adapted for use in brake and clutch linings. Still more particularly, it relates to the use of these materials in dry, pad-type clutch linings.

BACKGROUND OF THE INVENTION

It is well-known that friction materials which are intended for use in heavy duty brake or clutch operations in motor vehicles must withstand severe service conditions. In use they are subjected to vigorous treatment by repeated and prolonged braking or clutching applications which develop high temperatures, usually above 500° F., in the friction materials, these temperatures sometimes exceeding 1000° F. on the friction surface of the material and progressively decreasing inwardly of such surface. These high temperatures, especially when occurring during high speed stops or following repeated applications of the brakes or clutches, tend to decompose the organic materials which act as a binder in the friction material. Such decomposition results in the formation of gaseous or liquid products which in some cases cause loss of braking or clutching efficiency. Moreover, the weakened, decomposed lining surfaces may wear faster with resultant premature failure of these surfaces to perform their intended function.

In general, a friction material contains a matrix or binder such as a thermosetting resin, a high-melting fibrous material, and various additives which contribute friction and/or wear properties and bulk. In the past the fibrous material has invariably been chrysotile asbestos. Asbestos fiber imparts strength to the friction material and, at the same time, has a beneficial effect on friction properties. Moreover, in the past, it has been relatively cheap.

However, asbestos deposits throughout the world are rapidly being depleted, with the result that its cost is increasing. Moreover, the continued use of asbestos has recently come under a cloud because of the realization that it presents a serious cancer hazard for those who work with it. There has been an increasing concern about such hazard with the result that the expense of health precautions now required for the safe handling of asbestos has become a significant burden. Accordingly, it has become desirable to eliminate asbestos from frictional material formulations and to find a replacement.

U.S. Pat. No. 3,967,037 (Marzocchi et al.) deals with brake linings wherein the friction material comprises glass fibers bonded with a cured organic binder, a heat-conducting particulate metal and a binder-modifying agent. An example of such a composition is shown at column 3, lines 48–57 containing glass fibers, a phenolic resin, an "elastomer", cuprous oxide and antimony sulfide.

U.K. Pat. No. 2,003,088 deals with disk brake pads and a process for their production. The brake pad comprises a friction layer and backplate layer bonded thereto. On page 2 of this patent there appears a list of several different ingredients from which the friction layer can be prepared, including phenol-formaldehyde resins, acrylonitrile rubber, copper oxide, antimony sulfide, molybdenum sulfide, etc. The preferred fibrous ingredient, however, appears to be asbestos.

SUMMARY OF THE INVENTION

The present invention is an asbestos-free, pad-type, friction material comprising in combination an aromatic polyamide fiber, a binder, from about 3 to about 15 parts of antimony sulfide and from about 7 to about 30 parts of copper oxide. This friction material serves well both in clutch and brake applications; it has excellent friction properties, exhibiting a relatively high degree of coefficient of friction through a wide range of temperature and having good resistance to normal conditions of wear in such applications. A particularly preferred friction material is one as above which additionally contains barytes.

DESCRIPTION OF THE PREFERRED EMBODIMENTS

The inorganic fiber is as indicated an aromatic polyamide. Aromatic polyamides are commercially available in forms, e.g., yarn, pulp, etc., identified by the trademarks "Fiber B," "Kevlar," "DP-01," "Nomex," and others. Aramid is a generic expression denoting fibers made from the condensation product of isophthalic or terephthalic acids and m- or p-phenylenediamine. "Fiber B" and "Kevlar" are generally understood to identify products of the condensation of terephthalic acid and p-phenylenediamine, while "Nomex" is understood to identify the condensation product of isophthalic acid and m-phenylenediamine. The term aramid has been defined as a manufactured fiber in which the fiber-forming substance is a long-chain synthetic armoatic polyamide in which at least 85% of the amide linkages are attached directly to two aromatic linkages. More information is contained in U.S. Pat. No. 3,393,210 which is incorporated herein by reference. The aramid prepared from terephthalic acid and p-phenylenediamine is preferred.

The aramid fibers may be in any physical form. They may be in the form of strand, yarn, cord chopped strand, roving, tape, cloth, pulp, mat, glass wool or the like. Preferably, they are in the form of pulp or chopped strand and when in this latter form, are still more preferably within the range of from about ⅛ inch to 1 inch in length. The glass fibers preferably are RFL-coated; the term "RFL" indicating the dried residue of a coating composition which contained a natural rubber and/or a synthetic hydrocarbon chain rubber and a phenolic resin. Sized glass fibers likewise are contemplated. Other fibrous materials may be present also, including glass, wollastonite, basalt, fiberized slag, a polycrystalline, refractory metal oxide and the like. The proportion of fiber in the friction material will range from about 25% to about 50%. The proportions of aromatic polyamide fiber in the friction material will range from about 4% to about 7%. In the usual case, a mixture of aromatic polyamide fiber and glass fiber is used. In such instances the amount of glass fiber will range from about 15% to about 35%.

The binder may be either or both of two types: (1) a phenolic resin or (2) a copolymer of acrylonitrile and butadiene. Any phenolic resin of the type ordinarily employed in the manufacture of friction elements can be used according to the present invention. An example of such a resin is one prepared by condensing equal molar proportions of formaldehyde and phenol using aqueous formic acid as a catalyst. The condensation reaction is continued until the product is a reversible, fusible thermoplastic material which is water-insoluble. It then is separated from the aqueous phase, comminuted and blended with hexamethylenetetramine in an amount sufficient to provide about one half mol of formaldehyde per mol of phenol in the condensate. Phenol/aldehyde resins obtained from cresols, xylenols or furfuryl alcohol as all or part of the phenolic reactant, and furfural as all or part of the aldehyde reactant, may be employed.

Typical resins, curable to an insoluble, infusible thermoset state are generally suitable for use herein, including for example, phenol/formaldehyde, phenol/furfural, aniline based resins such as aniline/formaldehyde, and phenol/aminoplast/formaldehyde. The amount of phenolic resin which should be used in the friction materials herein is 5–15%, based on the friction material.

The copolymer of acrylonitrile and butadiene generally will contain from about 20% to about 50% of acrylonitrile. Small proportions, i.e., from about 1% to about 5%, of other monomers such as acrylic acid, methacrylic acid and itaconic acid may be present. Nitrile rubbers, as these are ordinarily termed, are described more particularly in the Vanderbilt Rubber Handbook (1968), pp 99–118 (Nitrile Elastomers). The amount of nitrile rubber used in the friction material will range from about 10% to about 20%. The overall proportion of binder in the friction material is thus from about 15% to about 35%.

The friction material of the invention also contains minor proportions of antimony sulfide and copper oxide. These materials are chemically active at ordinary clutch engaging temperatures and are believed to help generate wear-reducing surface films under conditions of severe service. These two additives appear to act cooperatively to produce good wear characteristics in these asbestos-free friction materials.

Other ingredients may also be present including graphite, sulfur, friction dust, lead sulfide, copper powder, magnesium oxide, cobalt naphthenate, silica, aluminum oxide, chalk, kaolin, etc.

The cooperative action of the copper oxide and antimony sulfide in the friction materials of the invention is shown by a comparison of test results (from the Chase Test) from a composition (A) containing both of these, a second composition (B) containing only the copper oxide and a third composition (C) containing only the antimony sulfide.

|  | A | B | C |
|---|---|---|---|
| Acrylonitrile rubber | 15.5 | 14.9 | 15.9 |
| Phenolic resin | 8.0 | 7.9 | 8.2 |
| Graphite | 3.9 | 3.8 | 4.0 |
| Copper oxide (CuO) | 9.4 | 14.4 |  |
| Antimony sulfide (Sb$_2$S$_3$) | 3.7 |  | 10.7 |
| Cardolite | 8.4 | 8.3 | 8.6 |
| Sulfur | 10.6 | 10.5 | 10.5 |
| Wollastonite | 15.7 | 15.5 | 16.1 |
| RFL glass (¼") | 19.3 | 19.0 | 19.8 |
| Kevlar (pulp) | 5.5 | 5.4 | 5.7 |

The test results, obtained on a Chase Test Machine according to Test Procedures-SAE J661a, are shown in terms of coefficient of friction (the higher the better) and a wear rating (an average of 8 measurements, the lower the better), as follows:

TABLE I

|  | Coefficient of Friction | Wear |
|---|---|---|
| A | 0.39 | 0.011" |

TABLE I-continued

|  | Coefficient of Friction | Wear |
|---|---|---|
| B | 0.32 | 0.017" |
| C | 0.21 | 0.016" |

Increased concentrations of antimony sulfide and copper oxide result in correspondingly better test results, i.e., higher friction ratings and lower wear, as shown by the data in Table II. The compositions of the test samples are as follows:

|  | D | E |
|---|---|---|
| Acrylonitrile rubber | 14.4 | 13.4 |
| Phenolic resin | 7.4 | 6.9 |
| Graphite | 3.6 | 3.4 |
| Copper oxide (CuO) | 19.0 | 27.4 |
| Antimony sulfide (Sb$_2$S$_3$) | 7.7 | 11.1 |
| Cardolite | 7.8 | 7.3 |
| Sulfur | 9.8 | 9.2 |
| Wollastonite | 7.3 | — |
| RFL glass (¼") | 17.9 | 16.7 |
| Kevlar pulp | 5.1 | 4.7 |

TABLE II

|  | Coefficient of Friction | Wear |
|---|---|---|
| D | 0.47 | 0.009" |
| E | 0.48 | 0.006" |

It will be noted that D and E, which contain larger amounts of copper oxide and antimony sulfide than A, are also characterized by better friction and wear properties than A.

The effectiveness of the aromatic polyamide (aramid) as a friction component is shown by a comparison (in Table III) of A with a similar test sample D containing no aramid. D's composition is as follows:

| Acrylonitrile | 16.4 |
|---|---|
| Phenolic resin | 8.5 |
| Graphite | 4.1 |
| Copper Oxide (CuO) | 9.9 |
| Antimony sulfide (Sb$_2$S$_3$) | 3.9 |
| Cardolite | 8.9 |
| Sulfur | 11.2 |
| Wollastonite | 16.6 |
| RFL glass (¼") | 20.4 |

TABLE III

|  | Coefficient of Friction | Wear |
|---|---|---|
| A | 0.39 | 0.011" |
| D | 0.35 | 0.015" |

As noted, earlier, a particularly preferred friction material is one which includes as an additional component a minor proportion, i.e., from about 2% to about 15%, of barytes. Thus, substitution of barytes for half of the wollastonite in A results in a friction material (F) having excellent friction and wear properties. The exact composition of F is as follows:

| Acrylonitrile rubber | 14.8 |
|---|---|
| Phenolic resin | 7.7 |
| Graphite | 3.7 |
| Copper oxide (CuO) | 9.0 |
| Antimony sulfide (Sb$_2$S$_3$) | 3.5 |
| Cardolite | 8.0 |

| | |
|---|---|
| -continued | |
| Sulfur | 10.1 |
| Wollastonite | 7.5 |
| RFL glass (¼") | 18.5 |
| Kevlar | 5.3 |
| Barytes | 11.8 |

The effectiveness of F as a friction material is shown by the data in Table IV, where A is compared with F.

TABLE IV

| | Coefficient of Friction | Wear |
|---|---|---|
| A | 0.39 | 0.011" |
| F | 0.48 | 0.008" |

All parts and percentages herein, unless otherwise clearly stated, are by weight and are based on total compositions.

We claim:

1. An asbestos-free friction material having good friction stability and wear properties consisting essentially of an aromatic polyamide fiber, a binder, from about 3 to about 15 parts of antimony sulfide and from about 7 to about 30 parts of copper oxide.

2. The friction material of claim 1 wherein the binder is a mixture of two or more binders.

3. The friction material of claim 2 wherein one of the binders is a phenolic resin.

4. The friction material of claim 2 wherein the binder is a combination of phenolic resin and a copolymer of butadiene and acrylonitrile.

5. An asbestos-free friction material having good friction stability and wear properties consisting essentially of a mixture of glass fiber and an aromatic polyamide fiber, a phenolic resin, from about 1.5 to about 12 parts of antimony sulfide and from about 10 to about 25 parts of copper oxide.

6. The friction material of claim 1 wherein it contains also from about 2% to about 15% of barytes.

7. The friction material of claim 5 wherein it contains also from about 2% to about 15% of barytes.

* * * * *